Aug. 27, 1929.  M. J. JOHNSON  1,726,182
ELECTRICAL DEVICE AND SYSTEM

Filed Aug. 5, 1927

INVENTOR.
MANFRED J. JOHNSON
BY 
ATTORNEY

Patented Aug. 27, 1929.

1,726,182

UNITED STATES PATENT OFFICE.

MANFRED J. JOHNSON, OF BRIDGEPORT, CONNECTICUT.

ELECTRICAL DEVICE AND SYSTEM.

Application filed August 5, 1927. Serial No. 210,871.

This invention relates to electrical measuring systems, to methods of and means for obtaining a standard for use in such systems, and also to a thermocell per se.

Heretofore in measuring systems, particularly those using the potentiometer methods, there has been employed standard cells for producing an E. M. F. of known value through the medium of which the values necessary to the making of the measurements were obtained. These prior standard cells were of the electrogalvanic type, utilizing liquids or electrolytic solutions requiring careful handling and attention.

These standard cells are, of course, practicable for some purposes, better being previously unknown. But, they have inherent and recognized disadvantages, among the more important of which is that great care must be exercised that no appreciable amount of current be passed through the cell, for if excess current flows through the cell polarization occurs and the cell is rendered permanently or temporarily inoperative as a standard depending upon the amount of excess current passed through it and the duration of current flow. Moreover, the electrolyte is subject to freezing, and hence care must be taken to keep the standard cell sufficiently warm.

This is an important disadvantage, for, while the potentiometer method of measuring and calibrating instruments was previously confined largely to the laboratory, it is now extremely desirable to use it in the field in connection with temperature measuring and controlling devices, outdoors in freezing temperatures and in refrigeration plants.

These and other disadvantages are overcome by the present invention by the provision of a device in which standard or calibrating electromotive force is supplied by a generator whose output depends upon the E. M. F. flowing through the slide-wire circuit and not as heretofore to a primary source of E. M. F. wholly unrelated to the electromotive force which passes through the slide-wire when the actual tests or measurements is being made.

This generator, in its preferred form, according to the present invention, comprises a thermocouple enclosed in an evacuated vessel with a heater wire which, in the system shown, forms part of the slide-wire circuit.

With this device, which will hereinafter be called a thermocell, no liquids or solutions are used, and hence the device is not subject to freezing and can be made to operate in any temperature; the hot and cold ends of the thermocouple are in such close proximity that their respective temperatures for the desired standard given current are so great with relation to the atmospheric temperatures that the temperatures of the cold ends remain substantially constant, any variation being infinitesimal and hence negligible. This thermocell has the further advantage that any current which happens to be passed through it, whether accidentally or unintentionally, does not alter its inherent characteristics, unless such an extremely high current is passed through it as to burn-out or destroy the heater wire or filament. Having nothing to polarize, the device is, of course, not subject to the poralization difficulties which are inherent in the electrogalvanic standard cells.

Another and very important feature and advantage of the thermocell and measuring system provided by the present invention is that of enabling alternating currents to be measured by the potentiometer method, for the thermocouple in the thermocell is, of course, responsive to heat generated by alternating current as well as heat generated by direct current.

A still further feature of this invention is the provision of a thermocell, the unlike metals of which are such as to produce zero electromotive force within the operating range of the cell when a predetermined amount of current passes through the heater wire, the predetermined amount of current being that used as a standard in the measuring system. Hence, in this device any variations from the standard of current in the heater wire and slide-wire of the potentiometer will give a reading on a galvanometer connected to the thermocell either plus or minus from the zero point.

Other features and advantages will hereinafter appear.

In the accompanying drawings—

Before proceeding to describe the system provided by the present invention and the means and methods of obtaining a standard for use in such systems, attention is called to the fact that the potentiometer methods of measuring is used not only in laboratories for measuring electrical characteristics such as potential, current and resistance, but is also used in the field for measuring these electrical characteristics and also temperatures and other phenomena.

Heretofore, when measuring temperatures, the slide-wire was provided with a current of predetermined strength obtained and determined by the use of a standard cell, and after this was done, a thermocouple and galvanometer in series were connected to the slide-wire, one end of the circuit being connected to a point on the slide-wire, adjacent the zero graduation and the other and movable end of the circuit being connected to the slide which is moved over the slide-wire along the graduated scale. Since, by the use of the counter E. M. F. of the standard cell, it was known that a predetermined current was flowing through the slide-wire and the wire being of known resistance, the potential drop at any point along the wire was thus also known. Hence, when the thermocouple was inserted in the material or atmosphere to be measured and the slide was moved over the slide-wire until the galvanometer had a zero reading, indicating that the drop in potential in the slide-wire was equal and opposite to the potential across the thermocouple, the reading of the point on the scale at which the slide was then located was used to determine in degrees the temperature being measured, the scale being set off in degrees.

This method of measuring temperatures is used extensively for high temperature measurements and temperature control.

With the methods and means heretofore provided, however, the reading on the scale, whether in the laboratory or in the field, had to be corrected or compensated for the temperature of the atmosphere in which the test was being made. Further, care had to be exercised that the standard cell was not exposed to a freezing temperature, otherwise the electrolytic solution might freeze and thus be rendered inoperative. Again, care had to be exercised that excessive current would not pass through the standard cell, for the standard cell would be thereby rendered permanently or temporarily inoperative due to the polarization, depending upon the strength of the excess current and the duration of its flow through the standard cell.

Figure 3:
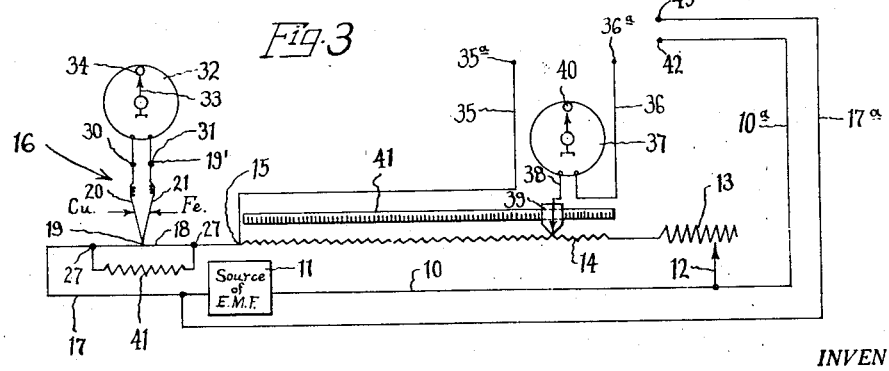
Fig. 3 is a schematic view showing the system of the present invention with the thermocell thereof in operative position in said system.
Figure 3:

Referring now in detail to the system provided by the present invention, as illustrated in Fig. 3, a wire 10 is connected at one end to a source of E. M. F. 11, and at the other end to a movable contact 12 of a variable resistance 13 connected to the slide-wire 14. The other terminal 15 of the slide-wire 14 is connected through the thermocell 16, provided by the present invention, to a wire 17 leading back to the source of E. M. F. 11.

The thermocell 16 comprises a heating wire or filament wire 18 and is connected to the slide-wire 14 at 15, and also to the wire 17 leading to the source of E. M. F. 11, so as to be in series with the source of E. M. F. 11, the slide-wire, and the variable resistance 13. Connected to the heating wire 18, or in close proximity thereto, is the junction 19 of a pair of wires 20 and 21 of unlike metals. These wires 20 and 21, according to the present invention and for reasons more fully explained below, are preferably of copper and iron respectively, because, within the limits of practical working temperatures as a thermocouple, they have the characteristic of reversing the direction of flow of current through the circuit to which they supply current, the voltage being zero at a critical temperature.

Figure 1:
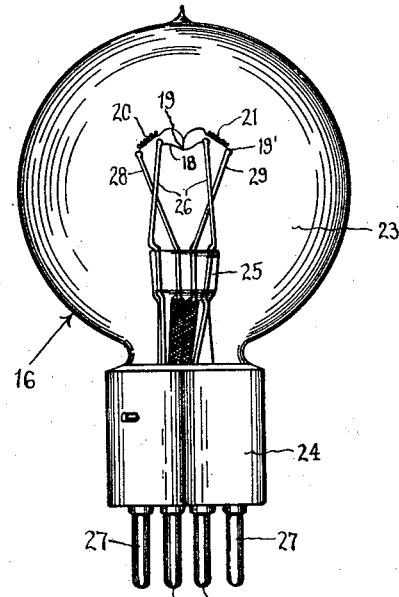
Figure 1 is an elevation of a thermocell or thermogenerator made in accordance with the present invention.
Figure 2:
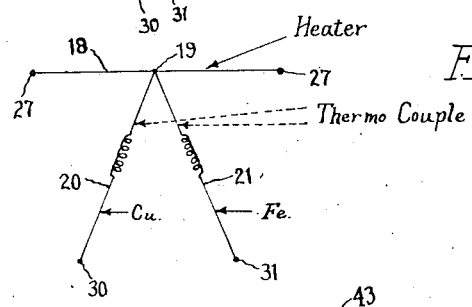
Fig. 2 is a diagrammatical view showing the arrangement of the thermocouple and heating wire.

In the physical embodiment of the invention shown in Fig. 1, the thermocell comprises an evacuated vessel or bulb 23 secured to a base 24 having a glass support 25 extending upwardly therefrom. The heating wire 18 is supported by wire rods 26 embedded in the support 25 and these rods 26 terminate in contacts 27 mounted in the base 24. The wires 20 and 21 of the thermocouple are supported on copper wire rods 28 and 29 respectively, terminating in contacts 30 and 31.

The base 24 is adapted to be inserted in any suitable socket such, for instance, as is used for radio tubes.

As indicated in Fig. 3, the contacts 30 and 31 from the copper wire 20 and iron wire 21 are connected, in the system shown, to a galvanometer 32 having a pointer 33 and a zero indication 34.

Before the measuring system can be used, it is necessary to ascertain whether or not the source of E. M. F. 11 is supplying a current of proper voltage to the slide wire 14 to make sure that indications of potential differences on the scale 35 adjacent the slide-wire are accurately coordinated with the actual potential drops along the slide-wire at such indications. For this purpose, the standard cell was heretofore used, the cell being used to set up in a part of the slide-wire circuit of known resistance, an E. M. F. counter to that coming from the source of E. M. F. 11 and equal to the potential drop occurring in the said part of the slide-wire circuit when the effective voltage of the current from the source of E. M. F. 11 on the slide-wire 14 was the standard voltage desired for making the test or measurement.

Instead of using the standard cell for this purpose, the present invention provides the thermocell or normally inert generator 16 which does not operate on the counter E. M. F. principle of balancing, but on the heat factor ($I^2R$ factor) of the E. M. F. supplied by source 11.

This is accomplished by using the heater wire 18 as the known part of the slide-wire circuit and so selecting and calibrating or shunting the wire 18 in the manufacture of the thermocell, that when electricity of predetermined current flows through the wire 18, the latter is heated to a predetermined temperature. This predetermined temperature according to the present invention is preferably that at which the thermoelectric current becomes zero, so that any change in this temperature of the wire 18 causes current generated in the thermocouple to flow in one direction or the other depending on whether the temperature is raised or lowered.

The galvanometer 32 being connected to the thermocouple 20 and 21 as its pointer 33 moved to either side of the zero mark 34 thereon when the voltage of the current flowing through the heater wire 18 varies from the desired standard which will cause the heater wire to reach the predetermined temperature above referred to.

Hence, in adjusting the system to the desired standard, the variable resistance 13 is shifted until a zero reading is obtained on the galvanometer 32 by which indication the person testing determines that the current of the desired standard voltage is flowing through the slide-wire 14 from the source of E. M. F. 11.

With the standard so determined, the device to be measured is connected to wires 35 and 36, the former being attached at the terminal 15 to the end of the slide-wire and the latter being connected to a galvanometer 37 having a wire 38 connected to the slide 39 of the slide-wire. Then the slide 39 is moved along the slide-wire 14 until the output voltage of the device to be tested is equal to and counterbalances the potential drop in the slide-wire between the terminal 15 and the point at which the slide 39 rests when the galvanometer 37 indicates by its zero indication 40 that this balanced condition exists. The reading on the scale 41 adjacent the slide-wire 14 then gives the desired information as to temperature, if the device connected to the wires 35 and 36 is a thermocouple and the scale 41 is graduated to degrees of temperature, or it indicates voltage, if a source of E. M. F. is connected to wires 35 and 36 and the scale is graduated accordingly.

It will be noted that, because of the relatively close proximity of the wires 20 and 21 to the hot junction 19 and because of the location of both the hot and cold ends in the evacuated vessel, the cold ends are partially heated by the heating wire 18 so as to be substantially warmer than the surrounding atmosphere, and it is not necessary to compensate for the differences in temperature of the cold ends when used in different atmospheres. Whether the thermocell is used in a cold room or in a room of ordinary temperature is practically immaterial, for the cold ends of the thermocouple are kept at a substantially higher temperature than any atmosphere in which the thermocouple might be used and their temperature is substantially constant, being controlled, more or less, by the temperatures of the wire 18.

If it be desired to carry the cold junction 19' to the outside of the vessel 23, or if a selected operating temperature of the heating wire be insufficient to heat the cold junction 19' substantially above room temperature, a compensating arrangement or device, such as is now used for the purpose of the art, may be employed to compensate for changes in temperature of the cold junction.

It has been above stated that the wire 18, according to the present invention, is so selected or calibrated or shunted that it may be used as a known part of the slide-wire circuit. This accurate predetermining of the heater wire 18 may be accomplished by making the wire of predetermined length, material and cross-sectional area in the course of manufacturing the device. It is preferable, however, due to the expense and difficulty involved in so accurately predetermining the resistance of the wire 18 to provide the wire 18 with an outside shunt 41 (see Fig. 3), of sufficient resistance so that, taken in conjunction with the resistance of the heating wire, the desired heating effect will be obtained when a current of predetermined voltage is flowing through the slide-wire. This shunt resistance 41 may be contained in the base 24 of the thermocell, or it may be an extraneous resistance contained in the socket for the thermocell, or otherwise, as desired. Thus, when manufacturing the thermocell, the resistance of the heating wire 28 may be determined as accurately as possible without too great an expenditure of time and effort, and after the cell has been completely made it may be tested and sufficient shunt resistance 41 added to cause the potential drop across the terminals 27 to be that necessary for successful use of the device with a slide-wire potentiometer.

Since the standard determining means of the present invention—namely the thermocell 16—depend on the heat factor (I²R) and not upon counterbalancing E. M. F., which is the case with the standard cell, it may be used with alternating current, a result impossible to accomplish heretofore by the potentiometer method of measuring and the use of a standard cell.

When this is to be done, the alternating current device, the output of which is to be tested, is operated by the source of E. M. F. 11 which is used to energize the slide-wire, and in such case the source of E. M. F. 11 is of alternating current. Hence, in Fig. 3, the wire 10 coming from the source of E. M. F. 11 is provided with a branch 10ª, and the wire 17 coming from the opposite side of the source of E. M. F. 11 is provided with a branch 17ª, and these branches respectively lead to terminals 42 and 43 adapted to supply current or power to the device to be tested. Thus, it will be seen, when an alternating current device such as a transformer is to be tested, the input circuit side of the transformer is connected to the terminals 42 and 43 and is supplied with current from the source of E. M. F. 11, and the output side of the transformer is connected to the terminals 35ª and 36ª of the wires 35 and 36 leading to the slide-wire 14 and galvanometer 37 respectively.

It should be understood that, according to the broader aspect of the present invention, the thermocell may be so constructed as to give a positive or negative reading on the galvanometer at the critical temperature of the heating wire. However, it is found most practical to have the thermocell so constructed that at the critical temperature of the heating wire the flow of current through the galvanometer circuit is substantially nil.

Variations and modifications may be made within the scope of this invention and portions of the improvements may be used without others.

Having thus described the invention, what is claimed as new and for which it is desired to obtain Letters Patent, is:—

1. In a measuring system, the combination of a potentiometer including a source of E. M. F. therefor and regulating means for said source of E. M. F.; and a standard determining means connected to said potentiometer and comprising a normally inert generator controlled by current from said source of E. M. F. flowing through said potentiometer.

2. In a measuring system, the combination of a potentiometer including a source of E. M. F. therefor and regulating means for said source of E. M. F.; and a standard determining means connected to said potentiometer and comprising a normally inert thermo-generator controlled by current from said source of E. M. F. flowing through said potentiometer.

3. In a measuring system, the combination of a potentiometer including a source of E. M. F. therefor and regulating means for said source of E. M. F.; and a standard determining means connected to said potentiometer and comprising a device having the characteristic of absorbing a predetermined quantity of current when its output is nil, said device being energized by the current from said source of E. M. F. flowing through said potentiometer.

4. In a measuring system, the combination of a potentiometer including a source of E. M. F. therefor and regulating means for said source of E. M. F.; and a standard determining means connected to said potentiometer and comprising a normally inert generator responsive to alternating currents and controlled by the currents flowing from the source of E. M. F. through said potentiometer.

5. In a measuring system, the combination of a potentiometer including a source of E. M. F. therefor and regulating means for said source of E. M. F.; and a standard determining means connected to said potentiometer and comprising a thermocell controlled by current flowing from said source of E. M. F. through said potentiometer, said thermocell comprising connected iron and copper elements.

6. In a measuring system, the combination of a potentiometer including a source of E. M. F. therefor and regulating means for said source of E. M. F.; and a standard determining means connected to said potentiometer and comprising a thermocell controlled by current flowing from said source of E. M. F. through said potentiometer, said thermocell comprising connected iron and copper elements enclosed in an evacuated vessel.

7. In a measuring system, the combination of a potentiometer including a source of E. M. F. therefor and regulating means for said source of E. M. F.; and a standard determining means connected to said potentiometer and comprising a thermocell controlled by current flowing from said source of E. M. F. through said potentiometer, said thermocell comprising connected iron and copper elements, and a heating element engaging the connected ends of the copper and iron elements.

8. In a measuring system, the combination of a potentiometer including a source of E. M. F. therefor and regulating means for said source of E. M. F.; and a standard determining means connected to said potentiometer and comprising a thermocell controlled by current flowing from said source of E. M. F. through said potentiometer, said thermocell comprising connected iron and copper elements and a heating element engaging the connected ends of the copper and iron elements, and an evacuated vessel enclosing said heating element and said copper and iron elements.

Signed at Bridgeport, in the county of Fairfield, and State of Connecticut, this 3rd day of August, 1927.

MANFRED J. JOHNSON.